US012612984B2

(12) United States Patent
Jiang et al.

(10) Patent No.: US 12,612,984 B2
(45) Date of Patent: Apr. 28, 2026

(54) DUST BLOWING GUN EXTENSION PIPE CAPABLE OF BEING FREELY BENT AND SHAPED

(71) Applicant: Ningbo Sinppa Technology Co., Ltd., Ningbo (CN)

(72) Inventors: Changguo Jiang, Ningbo (CN); Shifang Xu, Ningbo (CN)

(73) Assignee: Ningbo Sinppa Technology Co., Ltd, Ningbo (CN)

( * ) Notice: Subject to any disclaimer, the term of this patent is extended or adjusted under 35 U.S.C. 154(b) by 447 days.

(21) Appl. No.: 18/367,461

(22) Filed: Sep. 13, 2023

(65) Prior Publication Data

US 2025/0035239 A1     Jan. 30, 2025

(51) Int. Cl.
| | |
|---|---|
| *F16L 11/08* | (2006.01) |
| *F16L 33/24* | (2006.01) |
| *B08B 5/02* | (2006.01) |

(52) U.S. Cl.
CPC ............. *F16L 11/081* (2013.01); *F16L 33/24* (2013.01); *B08B 5/02* (2013.01)

(58) Field of Classification Search
CPC ....... F16L 11/081; F16L 33/24; F16L 33/003; F16L 11/12; B08B 5/02
USPC ........................................................ 138/118
See application file for complete search history.

(56) References Cited

U.S. PATENT DOCUMENTS

| | | | | |
|---|---|---|---|---|
| 48,709 | A * | 7/1865 | Emory .................... | F16L 33/24 285/259 |
| 5,240,291 | A * | 8/1993 | Zornow .................. | F16L 33/24 285/251 |
| 5,286,068 | A * | 2/1994 | Wiebe ................. | F16L 19/0218 285/281 |
| 5,988,226 | A * | 11/1999 | Matthews ............... | F16L 11/12 138/109 |
| 6,425,418 | B1 * | 7/2002 | Maeda ................... | F16L 11/112 138/144 |
| 6,742,815 | B2 * | 6/2004 | McCurdy ................ | F16L 33/01 285/903 |
| 10,228,082 | B2 * | 3/2019 | De Nora ............... | F16L 33/224 |
| 11,554,391 | B1 * | 1/2023 | King .................. | B01D 46/4227 |
| 2003/0079791 | A1 * | 5/2003 | Wilson ..................... | B32B 1/08 138/140 |

(Continued)

FOREIGN PATENT DOCUMENTS

CN       2023200029786       7/2023

*Primary Examiner* — Muhammad Ijaz

(57) ABSTRACT

A dust blowing gun extension pipe capable of being bent and shaped includes a flexible inner pipe, the flexible inner pipe is sleeved with a spring assembly; an outer portion of the spring assembly is coated with a flexible coating layer, two ends of the flexible inner pipe are respectively connected to a connector assembly, and the connector assembly interacts with the flexible inner pipe to form an air channel; the connector assembly comprises a first connector and a second connector, the first connector is provided with a first extension portion, and the first extension portion is sleeved between the flexible inner pipe and the spring assembly; an end portion of the flexible inner pipe extends into the first connector, an end portion of the flexible inner pipe is provided with a protruding ring, and the first connector is internally provided with a limiting step portion.

10 Claims, 7 Drawing Sheets

(56)    References Cited

U.S. PATENT DOCUMENTS

| | | | |
|---|---|---|---|
| 2005/0005988 A1* | 1/2005 | Pasquet | F16L 11/127 |
| | | | 138/125 |
| 2006/0112534 A1* | 6/2006 | Seton-Anderson | F16L 33/003 |
| | | | 29/508 |
| 2016/0312927 A1* | 10/2016 | Blanchette | F16L 27/0812 |
| 2020/0072395 A1* | 3/2020 | Zhang | F16L 33/224 |
| 2020/0271259 A1* | 8/2020 | Abrams | F16L 55/005 |
| 2020/0347975 A1* | 11/2020 | Chen | F16L 33/24 |
| 2021/0003236 A1* | 1/2021 | Echtle | F16L 33/2073 |
| 2021/0062939 A1* | 3/2021 | Zhang | F16L 11/12 |
| 2021/0252823 A1* | 8/2021 | Takimoto | B32B 1/08 |
| 2023/0323990 A1* | 10/2023 | Boraschi | B08B 9/0328 |
| | | | 285/222.1 |
| 2024/0102586 A1* | 3/2024 | Forrester | F16L 11/112 |
| 2025/0035239 A1* | 1/2025 | Jiang | F16L 11/12 |
| 2025/0354633 A1* | 11/2025 | Cheng | F16L 33/2071 |

* cited by examiner

DUST BLOWING GUN EXTENSION PIPE CAPABLE OF BEING FREELY BENT AND SHAPED

TECHNICAL FIELD

This invention generally relates to the technical field of pipe fittings, and more particularly, to a dust blowing gun extension pipe capable of being freely bent and shaped.

BACKGROUND

A dust blowing gun is primarily being used for dust removal in factories, installation, and maintenance. It is most suitable for cleaning narrow and high places, as well as air pipes that cannot be reached by hands. A pneumatic dust blowing gun utilizes the principle of air amplification to effectively reduce the consumption of compressed air, thereby generating a strong and precise airflow and enabling the surrounding air to flow together. A dust blowing gun mainly comprises a gun body, a gun pipe and a dust blowing gun head, wherein one end of the gun pipe is connected to an air outlet end of the gun body, and the other end of the gun pipe is connected to the dust blowing gun head. During operation, the compressed air in the gun body flows to the dust blowing gun head through the gun pipe, thereby removing the dust on the surface to be cleaned. Normally, the conventional gun pipe of the dust blowing gun is made of a non-bendable hard metal material, that the shape of the gun pipe cannot not be changed after production. The relative angle between the dust blowing gun head and the gun body cannot be changed through the gun pipe, resulting in limited dust blowing angle and inconvenient use.

Presently, various spring pipes capable of being freely bent are sold on the market. For example, Chinese patent CN202320002978.6 discloses a spring pipe capable of being freely bent and shaped, wherein as shown in FIG. 1, the spring pipe comprises a flexible inner pipe 1', a spring assembly is sleeved outside the flexible inner pipe 1', and the spring assembly extends in the axial direction to two ends of the flexible inner pipe 1'. The exterior of the spring assembly is covered by a flexible coating layer 2', and two ends of the flexible coating layer 2' are fixedly sleeved with fastening sleeves 6'. One end of the flexible inner pipe 1' is fixedly connected to a first connector 3', and the other end of the flexible inner pipe 1' is fixedly connected to a second connector 7'. The first connector 3', the flexible inner pipe 1', and the second connector 7' interact to form an air channel 10' for allowing the compressed air to circulate. The spring pipe is capable of being freely bent and has a bent memory. However, the aforesaid spring pipe capable of being freely bent and shaped has the following shortcomings: the connector is directly inserted into the flexible inner pipe 1', which is inconvenient to assemble, and especially, when the flexible inner pipe 1' is relatively thin, it is difficult to install the connector in place: under such circumstances, the connector needs to be screwed into the flexible inner pipe 1', and after being assembled, a winding phenomenon may easily occur due to excessive squeezing, resulting in a blocked air path; moreover, the connector is connected to the flexible inner pipe 1' in a direct insertion manner, which may easily cause the loosening of the connector and leads to a poor use experience. Therefore, it is urgent for those skilled in the art to develop a novel structure.

SUMMARY

The purpose of the present invention is to provide a dust blowing gun extension pipe capable of being freely bent and shaped, with a simple and reasonable structure, which can be conveniently operated and assembled. According to the present invention, the flexible inner pipe is protected from winding.

To achieve the above purpose, the present invention adopts the following technical solution: a dust blowing gun extension pipe capable of being freely bent and shaped comprises a flexible inner pipe, wherein the flexible inner pipe is sleeved with a spring assembly, and the spring assembly extends axially to two ends of the flexible inner pipe, wherein an outer portion of the spring assembly is coated with a flexible coating layer, two ends of the flexible inner pipe are respectively connected to a connector assembly, and the connector assembly interacts with the flexible inner pipe to form an air channel for allowing a compressed air to circulate, wherein the connector assembly comprises a first connector and a second connector, wherein the first connector extends along the axial direction to be provided with a first extension portion, and the first extension portion is sleeved between the flexible inner pipe and the spring assembly, wherein an end portion of the flexible inner pipe extends into the first connector, an end portion of the flexible inner pipe is provided with a protruding ring, and the first connector is internally provided with a limiting step portion that interacts with the protruding ring, wherein the second connector is in threaded connection with the first connector, and the second connector extends along the axial direction to be provided with a second extension portion, wherein when the second connector and the first connector are tightened, the second extension portion extends into the flexible inner pipe, so that the flexible inner pipe is tightly limited between the first connector and the second connector.

In another embodiment of the present invention, a free end of the second connector is provided with an external thread or an internal thread.

In another embodiment of the present invention, the first extension portion is provided with a threaded portion, and the first extension portion is screwed into the spring assembly through the threaded portion.

In another embodiment of the present invention, a tapered guide portion is provided at an end portion of the second extension portion, and an end of the tapered guide portion away from the second connector is a small head end. When the second connector and the first connector are tightened, the tapered guide portion guides the second extension portion to extend into the flexible inner pipe while imposing an acting force in the radial direction on the flexible inner pipe.

In another embodiment of the present invention, the two ends of the flexible coating layer are fixedly sleeved with fastening sleeves.

In another embodiment of the present invention, the fastening sleeve is a metal sleeve.

In another embodiment of the present invention, the metal sleeves are L-shaped and are respectively inserted between the connector assembly and the flexible coating layer.

In another embodiment of the present invention, the spring assembly comprises a first spring and a second spring interacting with each other, and the second spring is embedded in the first spring.

In another embodiment of the present invention, a longitudinal section of the first spring is circular, and a longitudinal section of the second spring is triangular.

In another embodiment of the present invention, the flexible inner pipe, the first spring, the second spring and the flexible coating layer are sequentially sleeved from inside to outside.

Compared with the prior art, the present invention has the following advantages:

According to the dust blowing gun extension pipe capable of being freely bent and shaped of the present invention, the second connector is connected to the flexible inner pipe through the first connector, achieving a convenient assembly: even if the flexible inner pipe is thin, the connector assembly may also be installed in place: during the assembly, the flexible inner pipe is not excessively squeezed, which protects the flexible inner pipe against winding such that a smooth air path is ensured; moreover, the first connector is in threaded connection with the second connector, so that the first connector and the second connector are prevented from being separated from each other:

During the assembly of the present invention, an end portion of the flexible inner pipe extends into the first connector first, and due to the high flexibility and high deformation capability of the flexible inner pipe, the protruding ring arranged at the end of the flexible inner pipe is squeezed into the first connector: the protruding ring interacts with the limiting step portion of the first connector, and the first extension portion is sleeved between the inner pipe and the spring assembly: the first extension portion is screwed into the spring assembly through the threaded portion, so that the first connector is not easily disengaged: after the first connector is installed, the second connector is coated with glue and is in threaded connection with the first connector: when the second connector and the first connector are tightened, the tapered guide portion guides the second extension portion to extend into the flexible inner pipe while imposing an acting force in the radial direction on the flexible inner pipe, so that the tapered surface of the tapered guide portion is tightly attached to an inner wall of the flexible inner pipe: the connection between the flexible inner pipe and the connector assembly is stable, and in the radial direction, the flexible inner pipe is pressed between the inner wall of the first connector and the outer wall of the second extension portion: in the axial direction, the protruding ring of the flexible inner pipe is pressed between the limiting step portion and an end surface of the second connector, achieving ideal sealing effect while protecting the flexible inner pipe against winding: after installation, the connector assembly interacts with the flexible inner pipe to form an air channel for allowing the compressed air to circulate.

BRIEF DESCRIPTION OF THE DRAWINGS

In FIGS. 1-7: 1'—Flexible Inner Pipe, 2'—Flexible Coating Layer, 3'—The First Connector, 6'—Fastening Sleeve, 7'—The Second Connector, 10'—Air Channel, 1—Flexible Inner Pipe, 2—Spring Assembly, 3—Flexible Coating Layer, 4—Fastening Sleeve, 5—Connector Assembly, 6—The First Connector, 7—The Second Connector, 8—Limiting Step Portion, 9—The First Extension Portion, 10—Tapered Guide Portion, 11—External Thread, 12—Internal Thread, 13—Threaded Portion, 14—The First Spring, 15—The Second Spring, 16—Air Channel, 17—Protruding Ring, 18—The Second Extension Portion.

DETAILED DESCRIPTION

Drawings are combined hereinafter to further elaborate the technical solution of the present invention.

Figure 1:
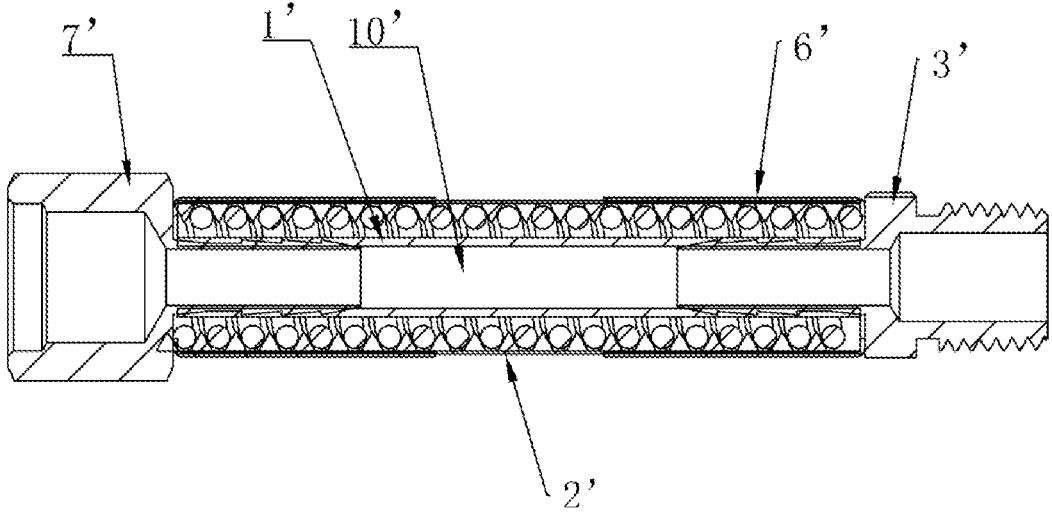
FIG. 1 is a schematic diagram illustrating a sectional view of the dust blowing gun extension pipe capable of being freely bent and shaped of the present invention.
Figure 2:
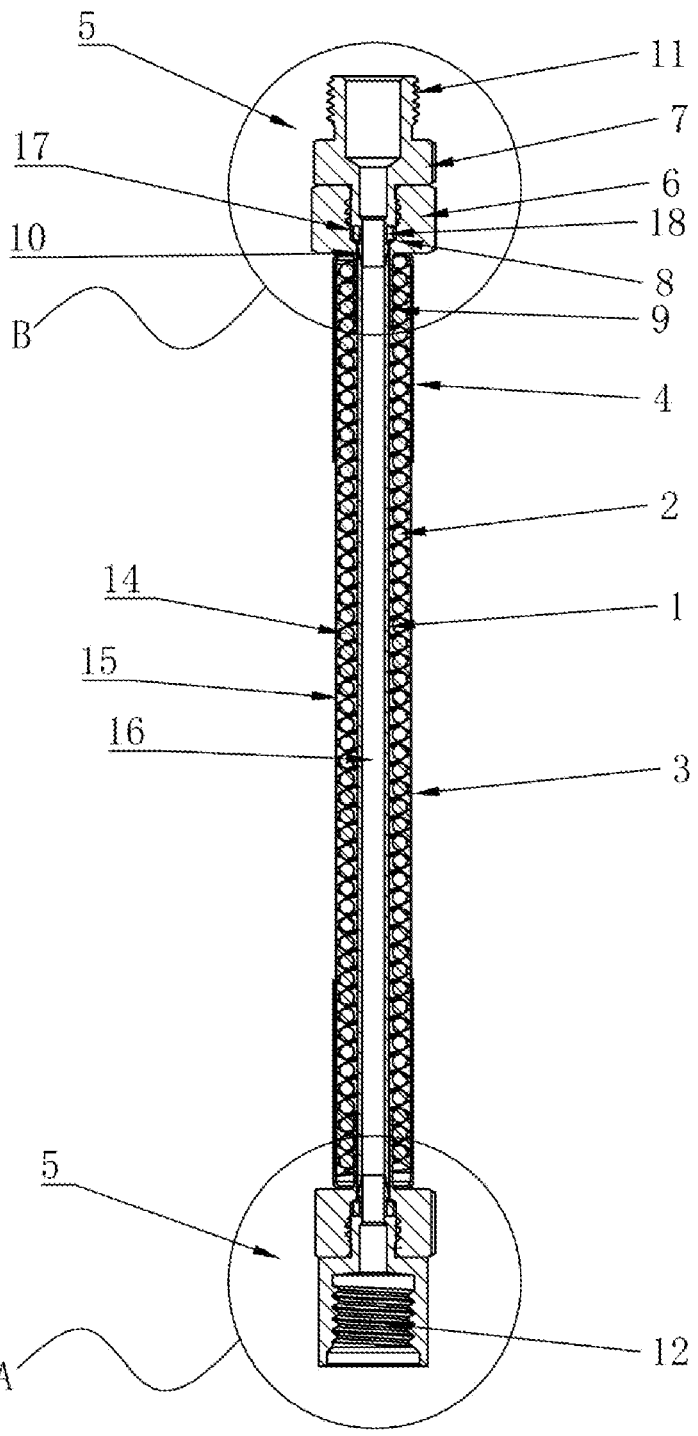
FIG. 2 is a schematic diagram illustrating a sectional view of the present invention.
Figure 3:
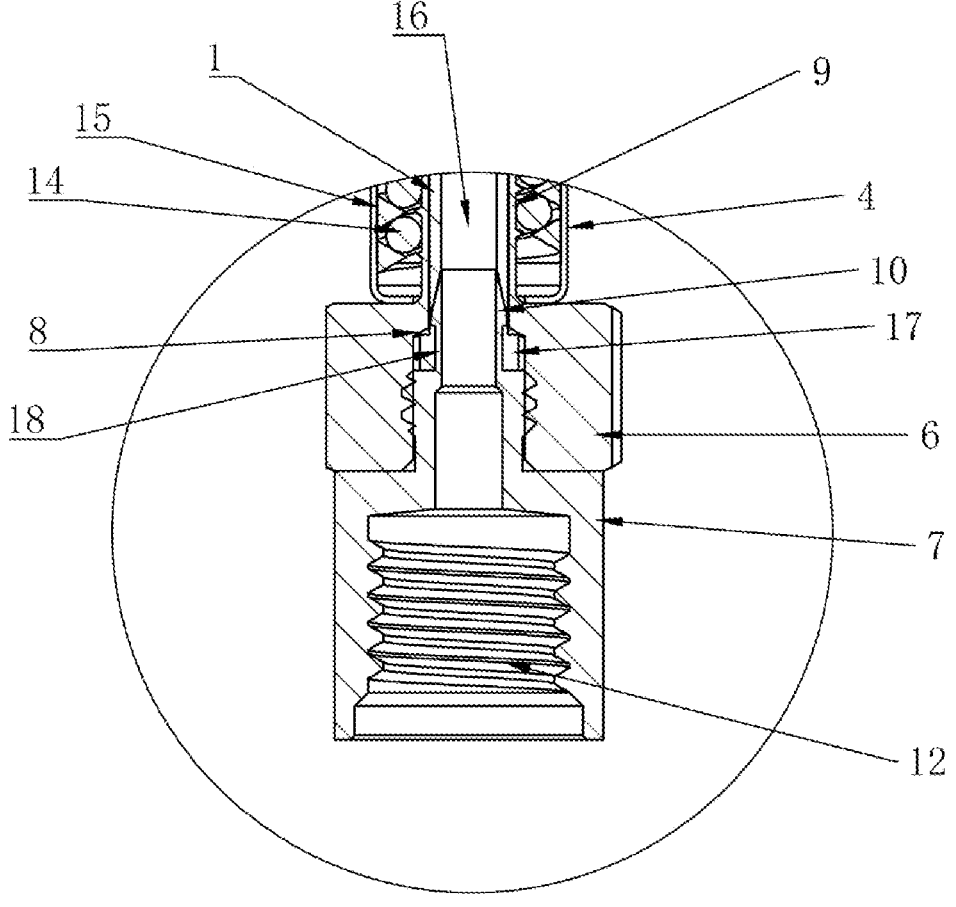
FIG. 3 is a schematic diagram illustrating an enlarged structure of portion A in FIG. 2.
Figure 4:
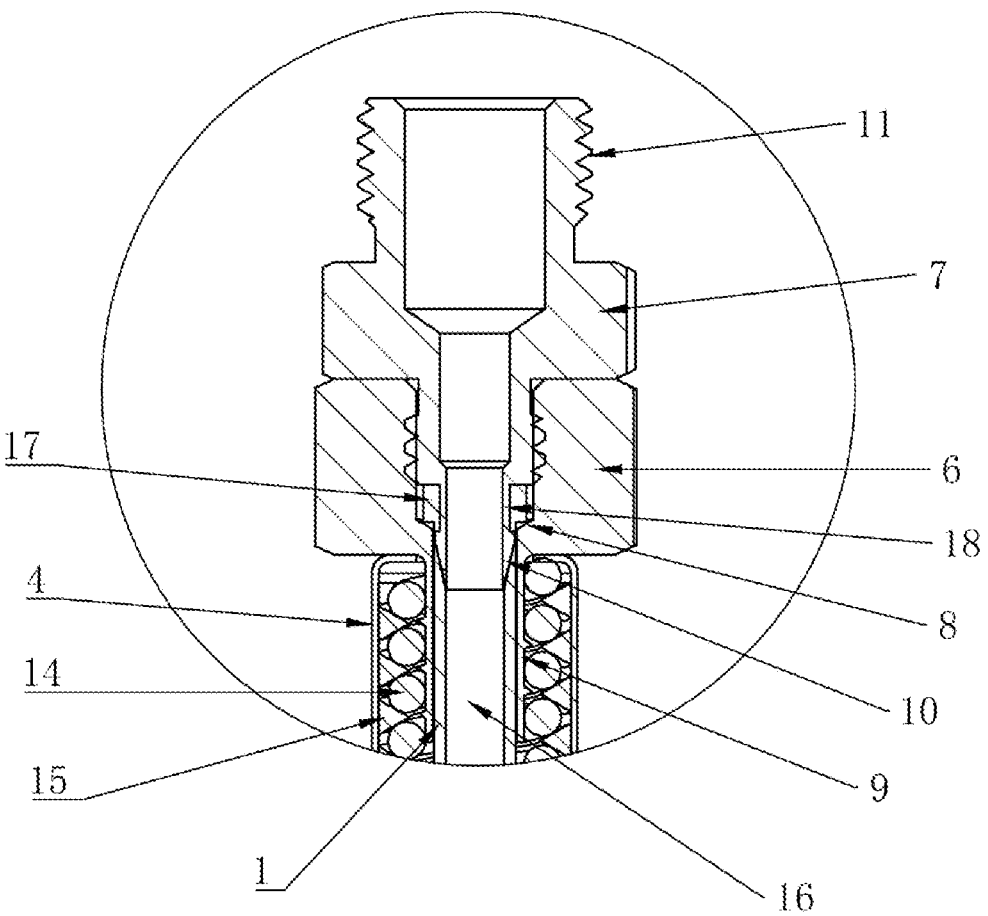
FIG. 4 is a schematic diagram illustrating an enlarged structure of portion B in FIG. 2.
Figure 5:
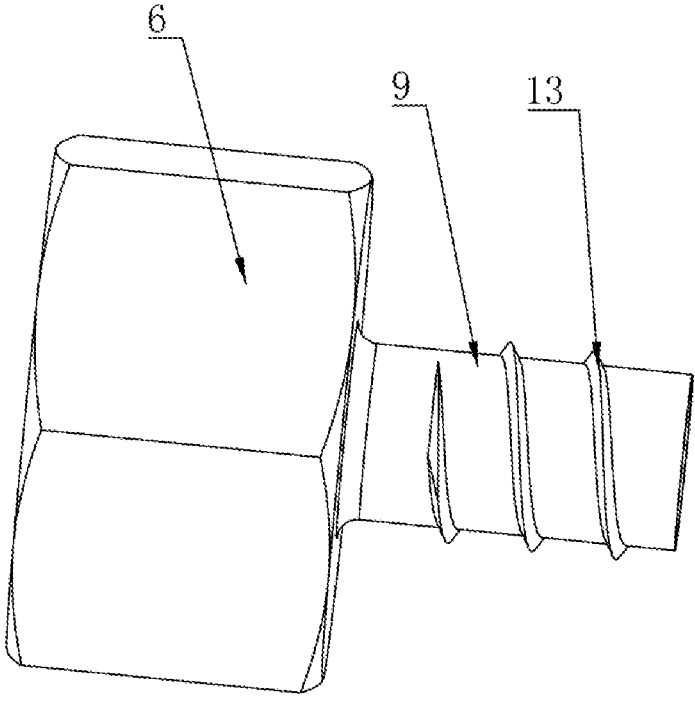
FIG. 5 is a schematic diagram illustrating an exemplary structure of the first connector of the present invention.
Figure 6:
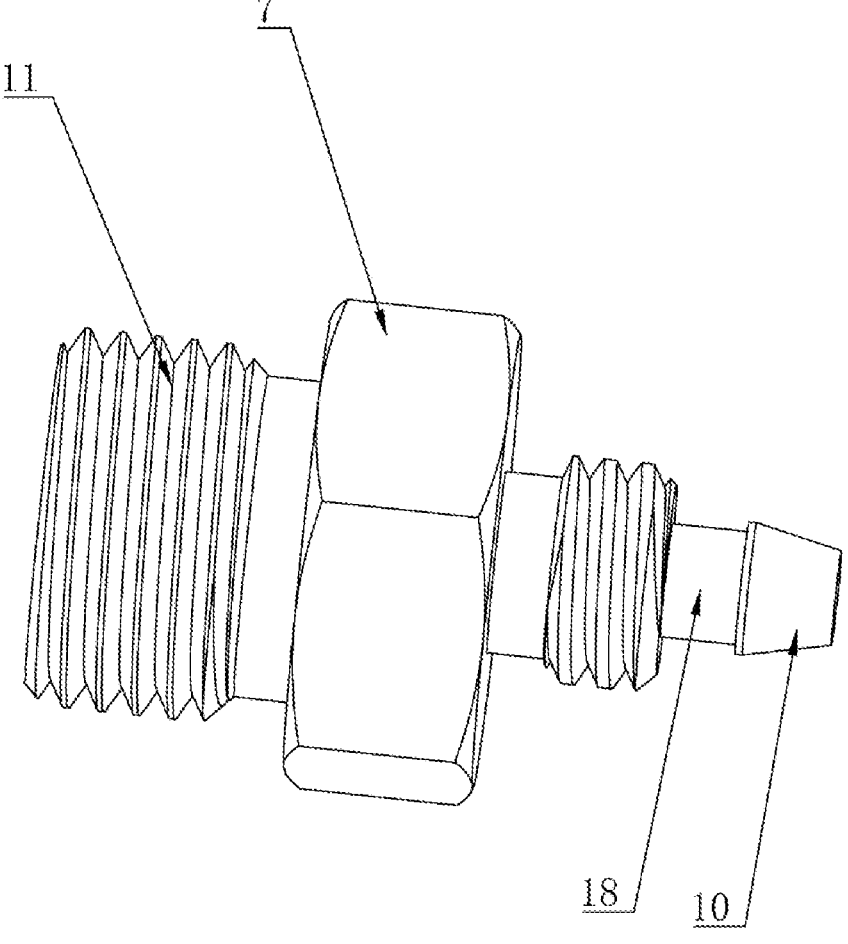
FIG. 6 is a schematic diagram illustrating an exemplary structure of the second connector of the present invention.
Figure 7:
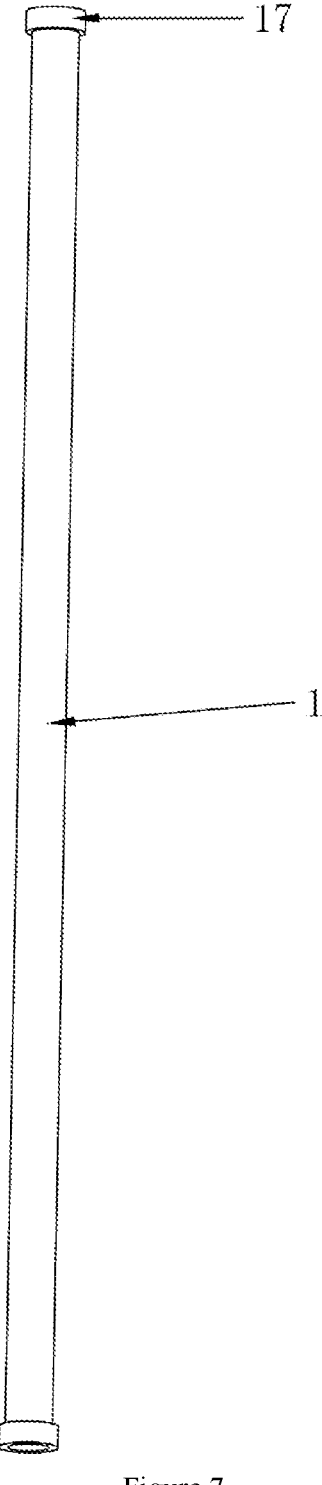
FIG. 7 is a schematic diagram illustrating an exemplary structure of the flexible inner pipe of the present invention.

As shown in FIGS. 2-7, the dust blowing gun extension pipe capable of being freely bent and shaped of the present invention comprises a flexible inner pipe 1, wherein the flexible inner pipe 1 is sleeved with a spring assembly 2, and the spring assembly 2 extends axially to two ends of the flexible inner pipe 1. The outer portion of the spring assembly 2 is coated with a flexible coating layer 3, two ends of the flexible inner pipe 1 are respectively connected to a connector assembly 5, and the connector assembly 5 interacts with the flexible inner pipe 1 to form an air channel 16 for allowing a compressed air to circulate. The connector assembly 5 comprises a first connector 6 and a second connector 7, wherein the first connector 6 extends along the axial direction to be provided with a first extension portion 9, and the first extension portion 9 is sleeved between the flexible inner pipe 1 and the spring assembly 2. An end portion of the flexible inner pipe 1 extends into the first connector 6, an end portion of the flexible inner pipe 1 is provided with a protruding ring 17, and the first connector 6 is internally provided with a limiting step portion 8 that interacts with the protruding ring 17. The second connector 7 is in threaded connection with the first connector 6, and the second connector 7 extends along the axial direction to be provided with a second extension portion 18. When the second connector 7 and the first connector 6 are tightened, the second extension portion 18 extends into the flexible inner pipe 1, so that the flexible inner pipe 1 is tightly limited between the first connector 6 and the second connector 7.

According to the dust blowing gun extension pipe capable of being freely bent and shaped of the present invention, the second connector 7 is connected to the flexible inner pipe 1 through the first connector 6, achieving a convenient assembly. Even if the flexible inner pipe 1 is thin, the connector assembly 5 may also be installed in place. During the assembly, the flexible inner pipe 1 is not excessively squeezed, which protects the flexible inner pipe 1 against winding such that a smooth air path is ensured. Moreover, the first connector 6 is in threaded connection with the second connector 7, so that the first connector 6 and the second connector 7 are prevented from being separated from each other.

Preferably, in this embodiment, a free end of the second connector 7 is provided with an external thread 11 or an internal thread 12, which allows the second connector 7 to be conveniently fixedly connected to a dust blowing gun head or an air cylinder.

Preferably, in this embodiment, the first extension portion 9 is provided with a threaded portion 13, and the first extension portion 9 is screwed into the spring assembly 2 through the threaded portion 13.

Preferably, in this embodiment, a tapered guide portion 10 is provided at an end portion of the second extension portion 18, and an end of the tapered guide portion 10 away from the second connector 7 is a small head end. When the second connector 7 and the first connector 6 are tightened, the tapered guide portion 10 guides the second extension portion 18 to extend into the flexible inner pipe 1 while imposing an acting force in the radial direction on the flexible inner pipe 1.

During the assembly of the present invention, an end portion of the flexible inner pipe 1 extends into the first connector 6 first, and due to the high flexibility and high deformation capability of the flexible inner pipe 1, the protruding ring 17 arranged at the end of the flexible inner pipe 1 is squeezed into the first connector 6. The protruding ring 17 interacts with the limiting step portion 8 of the first connector 6, and the first extension portion 9 is sleeved between the inner pipe and the spring assembly 2. The first extension portion 9 is screwed into the spring assembly 2 through the threaded portion 13, so that the first connector 6 is not easily disengaged. After the first connector 6 is installed, the second connector 7 is coated with glue and is in threaded connection with the first connector 6. When the second connector 7 and the first connector 6 are tightened, the tapered guide portion 10 guides the second extension portion 18 to extend into the flexible inner pipe 1 while imposing an acting force in the radial direction on the flexible inner pipe 1, so that the tapered surface of the tapered guide portion 10 is tightly attached to an inner wall of the flexible inner pipe 1. The connection between the flexible inner pipe 1 and the connector assembly 5 is stable, and in the radial direction, the flexible inner pipe 1 is pressed between the inner wall of the first connector 6 and the outer wall of the second extension portion 18. In the axial direction, the protruding ring 17 of the flexible inner pipe 1 is pressed between the limiting step portion 8 and an end surface of the second connector 7, achieving ideal sealing effect while protecting the flexible inner pipe 1 against winding. After installation, the connector assembly 5 interacts with the flexible inner pipe 1 to form an air channel 16 for allowing the compressed air to circulate.

More specifically, the flexible inner pipe 1 is a PU pipe, which is a pneumatic pressure flexible pipe mainly used in the pneumatic industry. A PU pipe possesses good wear resistance and aging resistance, which helps prolong the functional life of the product. Additionally, the PU pipe has strong tensile strength and stable properties, which does not break after being bent or twisted for multiple times.

Preferably, in this embodiment, the two ends of the flexible coating layer 3 are fixedly sleeved with fastening sleeves 4.

More specifically, the flexible coating layer 3 is a rubber silica gel outer layer, which has a comfortable hand feeling, has high flexibility, is waterproof and dust-proof, and is capable of significantly improving the functional life of the product.

Preferably, in this embodiment, the fastening sleeve 4 is a metal sleeve.

Preferably, in this embodiment, the metal sleeves are L-shaped and are respectively inserted between the connector assembly 5 and the flexible coating layer 3.

After the installation of the metal sleeves is completed, the metal sleeves are pressed by using a mold, so that the metal sleeves are completely fixed on the flexible coating layer 3. The metal sleeves have stable properties, good wear resistance and corrosion resistance, and are capable of effectively playing a role of protection. The metal sleeves are L-shaped and are respectively inserted between the connector assembly 5 and the flexible coating layer 3. The L-shaped design serves a function of fastening, prevents the metal sleeves from falling off, and achieves high stability.

Preferably, in this embodiment, the spring assembly 2 comprises a first spring 14 and a second spring 15 interacting with each other, and the second spring 15 is embedded in the first spring 14. More specifically, both the first spring 14 and the second spring 15 are made of a metal material such that good stability is achieved.

Preferably, in this embodiment, a longitudinal section of the first spring 14 is circular, and a longitudinal section of the second spring 15 is triangular.

Preferably, in this embodiment, the flexible inner pipe 1, the first spring 14, the second spring 15 and the flexible coating layer 3 are sequentially sleeved from inside to outside. The first spring 14 is arranged outside the flexible inner pipe 1, wherein the first spring 14 has high elasticity, which allows the first spring 14 to easily recover after the external force disappears. The second spring 15 is embedded in the first spring 14, and the second spring 15 having a triangular longitudinal section tightly wraps the first spring 14, so that the resilience of first spring 14 is limited to a certain extent. The flexible coating layer 3 is arranged outside the first spring 14 and the second spring 15, and the flexible coating layer 3 tightly covers the first spring 14 and the second spring 15. The elastic modulus of the flexible coating layer 3 is greater than that of the first spring 14 and the second spring 15, and meanwhile, the flexible coating layer 3 has a tension force. The elasticity of the first spring 14 and the second spring 15 is greater than the elasticity of the flexible coating layer 3. The flexible coating layer 3 is capable of deforming along with deformation of the spring assembly 2 and supporting the spring assembly 2 such that the spring assembly 2 is prevented from the resilience. In this way, the extension pipe is capable of freely bent and has a bent memory, achieving a flexible operation, realizing multi-directional bending and twisting such that the use experience is significantly improved.

The above are merely preferred embodiments of the present invention, and therefore, the equivalent changes or modifications made according to the structures, features and principles described in the present invention shall fall into the scope defined by the claims of the present invention.

The invention claimed is:

1. A dust blowing gun extension pipe capable of being bent and shaped, comprising: a flexible inner pipe (1), wherein the flexible inner pipe (1) is sleeved with a spring assembly (2), and the spring assembly (2) extends axially to two ends of the flexible inner pipe (1), wherein an outer portion of the spring assembly (2) is coated with a flexible coating layer (3), two ends of the flexible inner pipe (1) are respectively connected to a connector assembly (5), and the connector assembly (5) interacts with the flexible inner pipe (1) to form an air channel (16) for allowing compressed air to circulate, wherein the connector assembly (5) comprises a first connector (6) and a second connector (7), wherein the first connector (6) extends along the axial direction to be provided with a first extension portion (9), and the first extension portion (9) is sleeved between the flexible inner pipe (1) and the spring assembly (2), wherein an end portion of the flexible inner pipe (1) extends into the first connector (6), an end portion of the flexible inner pipe (1) is provided with a protruding ring (17), and the first connector (6) is internally provided with a limiting step portion (8) that interacts with the protruding ring (17), wherein the second connector (7) is in threaded connection with the first connector (6), wherein the second connector (7) extends along the axial direction and is provided with a second extension portion (18), wherein when the second connector (7) and the first connector (6) are tightened, the second extension portion (18) extends into the flexible inner pipe (1), so that the flexible inner pipe (1) is limited between the first connector (6) and the second connector (7).

2. The dust blowing gun extension pipe capable of being bent and shaped of claim 1, wherein a free end of the second connector (7) is provided with an external thread (11) or an internal thread (12).

3. The dust blowing gun extension pipe capable of being bent and shaped of claim 1, wherein the first extension portion (9) is provided with a threaded portion (13), and the first extension portion (9) is screwed into the spring assembly (2) through the threaded portion (13).

4. The dust blowing gun extension pipe capable of being bent and shaped of claim 1, wherein a tapered guide portion (10) is provided at an end portion of the second extension portion (18), wherein when the second connector (7) and the first connector (6) are tightened, the tapered guide portion (10) guides the second extension portion (18) to extend into the flexible inner pipe (1) while imposing an acting force in the radial direction on the flexible inner pipe (1).

5. The dust blowing gun extension pipe capable of being bent and shaped of claim 1, wherein the two ends of the flexible coating layer (3) are fixedly sleeved with fastening sleeves (4).

6. The dust blowing gun extension pipe capable of being bent and shaped of claim 5, wherein the fastening sleeve (4) is a metal sleeve.

7. The dust blowing gun extension pipe capable of being bent and shaped of claim 6, wherein the metal sleeves are L-shaped and are respectively inserted between the connector assembly (5) and the flexible coating layer (3).

8. The dust blowing gun extension pipe capable of being bent and shaped of claim 1, wherein the spring assembly (2) comprises:

a first spring (14) and a second spring (15) interacting with each other, and the second spring (15) is embedded in the first spring (14).

9. The dust blowing gun extension pipe capable of being bent and shaped of claim 8, wherein a longitudinal section of the first spring (14) is circular, and a longitudinal section of the second spring (15) is triangular.

10. The dust blowing gun extension pipe capable of being bent and shaped of claim 8, wherein the flexible inner pipe (1), the first spring (14), the second spring (15) and the flexible coating layer (3) are sequentially sleeved from inside to outside.

* * * * *